(12) United States Patent
Guo et al.

(10) Patent No.: US 9,193,275 B2
(45) Date of Patent: Nov. 24, 2015

(54) IN-VEHICLE CHARGER (75) Inventors: Bin Guo, Guangdong (CN); Jianhua Zhang, Guangdong (CN); Hongbin Luo, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 244 days.

(21) Appl. No.: 13/305,026

(22) Filed: Nov. 28, 2011

(65) Prior Publication Data

US 2012/0086398 A1 Apr. 12, 2012

Related U.S. Application Data (63) Continuation of application No. PCT/CN2010/073116, filed on May 24, 2010.

(30) Foreign Application Priority Data

May 27, 2009 (CN) ...................... 2009 2 0132425 U (51) Int. Cl.
*H02J 7/00* (2006.01)
*B60W 10/24* (2006.01)
*B60L 11/18* (2006.01)

(52) U.S. Cl.
CPC ...... *B60L 11/1824* (2013.01); *B60W 2510/244* (2013.01); *Y02T 10/7005* (2013.01); *Y02T 90/12* (2013.01); *Y02T 90/121* (2013.01); *Y02T 90/14* (2013.01); *Y02T 90/16* (2013.01)

(58) Field of Classification Search
USPC ........................................................ 320/109
See application file for complete search history.

(56) References Cited

U.S. PATENT DOCUMENTS 6,150,794 A * 11/2000 Yamada et al. ................ 320/108
6,204,630 B1 3/2001 James
7,710,077 B2 * 5/2010 Zeng et al. ..................... 320/136

(Continued)

FOREIGN PATENT DOCUMENTS

| CN | 2834005 Y | 11/2006 |
|---|---|---|
| CN | 201438644 U | 4/2010 |
| JP | H 09-9417 A | 1/1997 |
| JP | H 10-194408 A | 7/1998 |
| JP | 2006-136119 A | 5/2006 |
| WO | WO 2010/135974 A1 | 12/2010 |

OTHER PUBLICATIONS

PCT International Search Report mailed Sep. 2, 2010, issued in International Application No. PCT/CN/2010/073116 (4 pages).
PCT International Preliminary Report on Patentability and Written Opinion mailed Dec. 8, 2011, issued in International Application No. PCT/CN/2010/073116 (6 pages).

*Primary Examiner* — Drew A Dunn
*Assistant Examiner* — Steve T Chung
(74) *Attorney, Agent, or Firm* — Finnegan, Henderson, Farabow, Garrett & Dunner, LLP (57) ABSTRACT An in-vehicle charger of an electric vehicle or a hybrid electric vehicle is provided. The in-vehicle charger comprises: a rectification and voltage-stabilizing circuit, which inputs, rectifies and stabilizes a commercial power; a traction battery charging circuit, which is electrically connected with the rectification and voltage-stabilizing circuit, and which charges a traction battery; a control communication circuit, which is electrically connected with the rectification and voltage-stabilizing circuit, and which controls the traction battery charging circuit; and a starting battery charging circuit, which is electrically connected with the rectification and voltage-stabilizing circuit, and which starts charging of a starting battery under control of the control communication circuit.

21 Claims, 5 Drawing Sheets

(56) References Cited

U.S. PATENT DOCUMENTS

| | | | |
|---|---|---|---|
| 7,847,521 B2* | 12/2010 | Iida | 320/138 |
| 2009/0096410 A1* | 4/2009 | Sakurai | 320/104 |
| 2009/0103341 A1* | 4/2009 | Lee et al. | 363/124 |
| 2010/0198440 A1* | 8/2010 | Fujitake | 701/22 |
| 2010/0213887 A1* | 8/2010 | Louch et al. | 320/101 |
| 2010/0228413 A1* | 9/2010 | Fujitake | 701/22 |
| 2010/0231169 A1* | 9/2010 | Hashim et al. | 320/134 |
| 2011/0166728 A1* | 7/2011 | Gale et al. | 701/22 |
| 2012/0049792 A1* | 3/2012 | Crombez | 320/109 |

* cited by examiner

IN-VEHICLE CHARGER

CROSS-REFERENCE TO RELATED APPLICATIONS

This application is a continuation of International Application No. PCT/CN2010/073116, filed on May 24, 2010, which claims the priority and benefit of Chinese Patent Application No. 200920132425.2, filed with State Intellectual Property Office of China on May 27, 2009, the entirety of both of which is incorporated herein by reference.

FIELD OF THE INVENTION

The present invention generally relates to an in-vehicle charger and more particularly to an in-vehicle charger of an electric vehicle or a hybrid electric vehicle.

BACKGROUND

The power battery of an electric vehicle or a hybrid electric vehicle comprises two parts: a starting battery and a traction battery. The starting battery is used to start the engine or motor of the vehicle, or to supply power to the vehicle body electric system before starting the vehicle. The traction battery is used to supply power to the motor after starting the vehicle, and the supplied power drives the motor to rotate the vehicle wheels.

The conventional in-vehicle charger of the electric vehicle or the hybrid electric vehicle only charges the traction battery. When the electric vehicle or the hybrid electric vehicle has not been started in a long time, the starting battery may feed power as a result of the static power of the vehicle body electric system. Although the electric energy of the traction battery may be converted and input to the starting battery via a DC/DC converter, the traction battery itself may also feed power due to self-electricity consumption or static power of the electrical apparatus connected with the traction battery. The starting battery and traction battery are simultaneously in feedback electricity state, which is required for charging both the traction battery and the starting battery. However, it may not be feasible to convert and input the electric energy of the traction battery to the starting battery via the DC/DC converter due to low voltage in the vehicle body electric system. The low voltage may be a result of the battery manager needs of the power supply during the charging process, and the feeding of the traction battery. Thus, the conventional in-vehicle charger may not be able to charge the traction battery when the starting battery and traction battery are simultaneously in feedback electricity state.

SUMMARY OF THE INVENTION

The present invention is directed to solve at least one of the problems in the prior art.

Accordingly, an embodiment of the present invention provides an in-vehicle charger which may charge the traction battery when the starting battery and traction battery are simultaneously in feedback electricity state.

The in-vehicle charger according to an embodiment of the present invention comprises: a rectification and voltage-stabilizing circuit, which inputs, rectifies, and stabilizes a commercial power; a traction battery charging circuit, which is electrically connected with the rectification and voltage-stabilizing circuit, and which charges a traction battery; a control communication circuit, which is electrically connected with the rectification and voltage-stabilizing circuit, and which controls the traction battery charging circuit; and a starting battery charging circuit, which is electrically connected with the rectification and voltage-stabilizing circuit, and which starts charging of a starting battery under the control of the control communication circuit.

According to another embodiment of the present invention, the starting battery charging circuit is provided in the in-vehicle charger. When the starting battery and traction battery are simultaneously in feedback electricity state, the starting battery charging circuit may be controlled by the control communication circuit to charge the starting battery. When the voltage of the starting battery reaches a threshold voltage, a battery manager may start so as to charge the traction battery by the traction battery charging circuit. This subsequently charges a power battery comprising the starting battery and the traction battery. Meanwhile, the starting battery charging circuit of the in-vehicle charger may continually charge the starting battery without a DC/DC converter. This improves charging efficiency and reduces the number of the electrical apparatus required in the charging process.

DETAILED DESCRIPTION OF EMBODIMENTS OF THE INVENTION

Reference will be made in detail to embodiments of the present invention. The embodiments described herein with reference to drawings are explanatory, illustrative, and used to generally understand the present invention. The embodiments shall not be construed to limit the present invention. Same or similar elements and elements having same or similar functions are denoted by common reference numerals throughout the descriptions.

Figure 1:
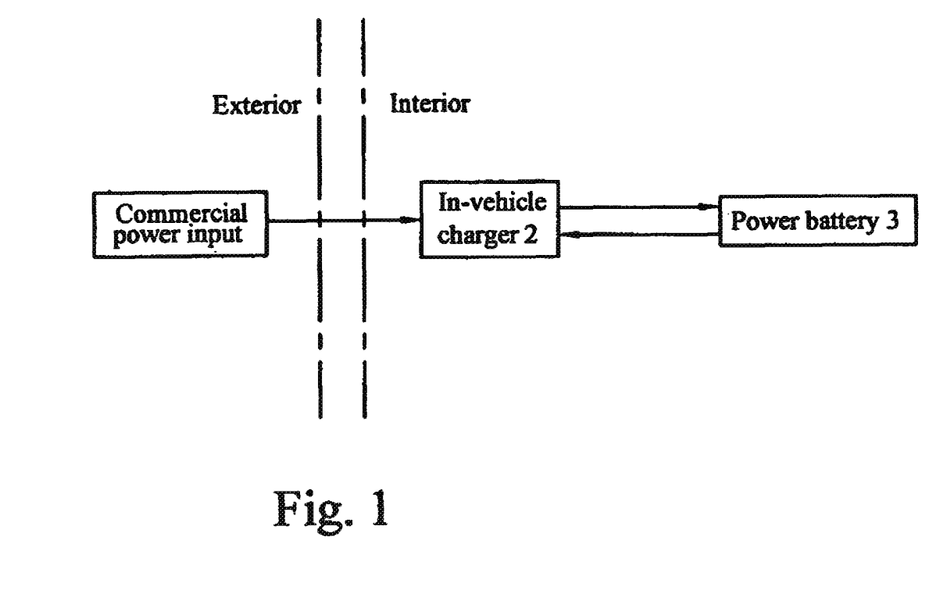
FIG. 1 is a schematic view of the operation state of a conventional in-vehicle charger.
Figure 2:
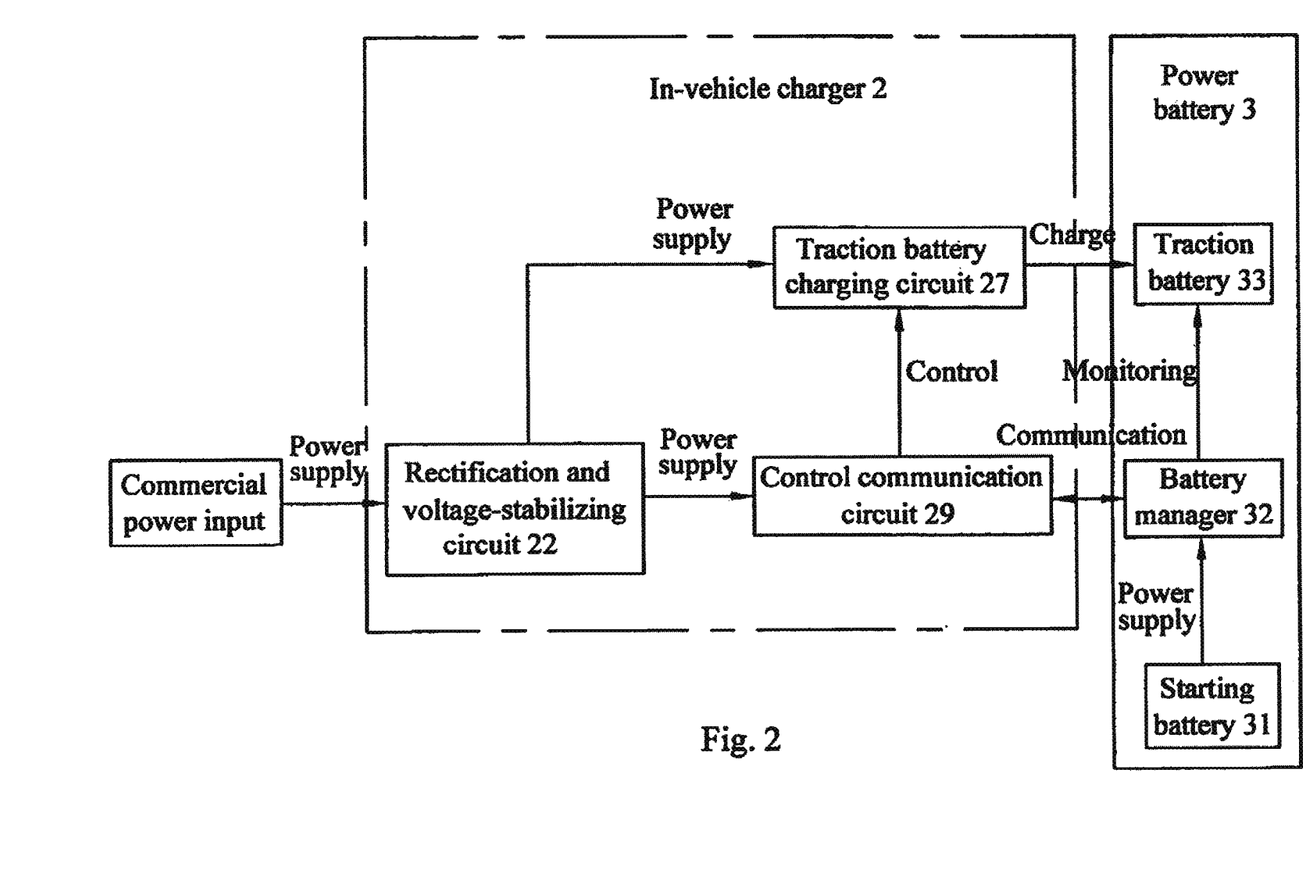
FIG. 2 is a structural view of the conventional in-vehicle charger of FIG. 1.
Figure 3:
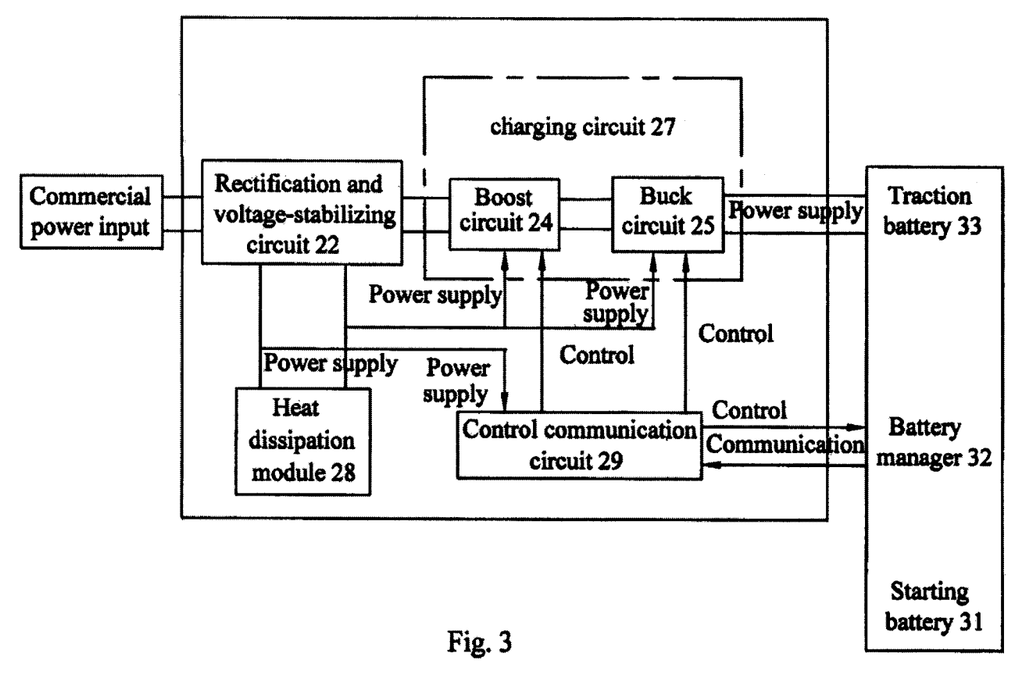
FIG. 3 is a schematic view showing circuits in the conventional in-vehicle charger of FIG. 1.

As shown in FIG. 1, a conventional in-vehicle charger 2 is used to connect a power supply (not shown) and a power battery 3 of an electric vehicle (EV) or hybrid electric vehicle (HEV), in order to charge a power battery 3. As shown in FIGS. 2 and 3, the conventional in-vehicle charger 2 generally comprises a rectification and voltage-stabilizing circuit 22, a traction battery charging circuit 27, and a control communication circuit 29. An AC signal of an input commercial power is converted into a DC signal and rectified, filtered, and voltage-stabilized by the rectification and voltage-stabilizing circuit 22. A signal power with a stable voltage is also provided by the rectification and voltage-stabilizing circuit 22 to the traction battery charging circuit 27 and the control communication circuit 29. The rectification and voltage-stabilizing circuit 22 then selects a conventional power factor correction circuit, which may be an active or passive circuit.

As shown in FIG. 3, the traction battery charging circuit 27 comprises a boost circuit 24 and a buck circuit 25. The signal power provided by the rectification and voltage-stabilizing circuit 22 is converted into a high voltage DC by the boost circuit 24, and forms a constant voltage source for the buck circuit 25. The boost circuit 24 may comprise a BOOST circuit controlled by control chips such as IR1150 and UC3854, with the main circuit further comprising an inductance coil, a switch transistor, a diode, and an output capacitance. Feedback of the voltage and current to the control chips realizes the boosting of the boost circuit 24.

The buck circuit 25 comprises a pulse width modulation buck circuit that adjusts the high voltage DC output from the boost circuit 24 to a suitable voltage and current for charging a traction battery 33. The buck circuit 25 provides a constant voltage and current for charging the traction battery 33, thereby ensuring safety during charging. The buck circuit 25 may comprise a non-isolated BUCK circuit controlled by pulse width modulation control chips such as UC3842, with the main circuit further comprising an inductance coil, a switch transistor, a diode, and an output capacitance. Feedback of the voltage and current to the control chips realizes the bucking of the buck circuit 25. The primary side of the main circuit comprises four switch transistors and driving circuits; the middle of the main circuit comprises an isolation transformer; and the secondary side of the main circuit comprises a full-wave rectifier and a filter circuit, and generally includes diodes, inductance coils, and output capacitances.

The control communication circuit 29 protects the software and realizes the communication among parts of the EV or HEV. The control communication circuit 29 may control the entire power supply for charging. For example, the control communication circuit 29 may control the start and termination of the charging, control the ON/OFF of the boost circuit 24 and the buck circuit 25, communicate with other modules (for example, the battery manager 32) such as modules used in CNC bus network in-vehicles, or receive state information from the power battery (such as state information relating to traction battery 33) to determine whether to charge the batteries based on the state information. The control communication circuit 29 may comprise a single-chip microcomputer with communication function.

As shown in FIG. 3, when the power battery 3 of the conventional EV or HEV feeds power, for example, when the starting battery 31 and the traction battery 33 feed power at different times, the in-vehicle charger 2 may charge the traction battery 33 via an input commercial power. The rectification and voltage-stabilizing circuit 22 may rectify and stabilize the commercial power to form a stable power signal which may be transferred to the control communication circuit 29 and the traction battery charging circuit 27. The traction battery charging circuit 27 may then charge the traction battery under the control of the control communication circuit 29. In charging the traction battery, the control communication circuit 29 may continue to communicate with the battery manager 32, and the battery manager 32 may provide real-time feedback to the control communication circuit 29 on information relating to the charging of the traction battery by the traction battery charging circuit 27. When the traction battery 33 reaches a saturation voltage, a signal may be fed back to the control communication circuit 29 by the battery manager 32, and operation of the traction battery charging circuit 27 may be stopped via the control communication 29, indicating that charging of the traction battery 33 of the power battery 3 is complete. The control and parameter detection relating to the charging process for the traction battery 33 are well known by those skilled in the art and detailed descriptions thereof are omitted.

Figure 4:
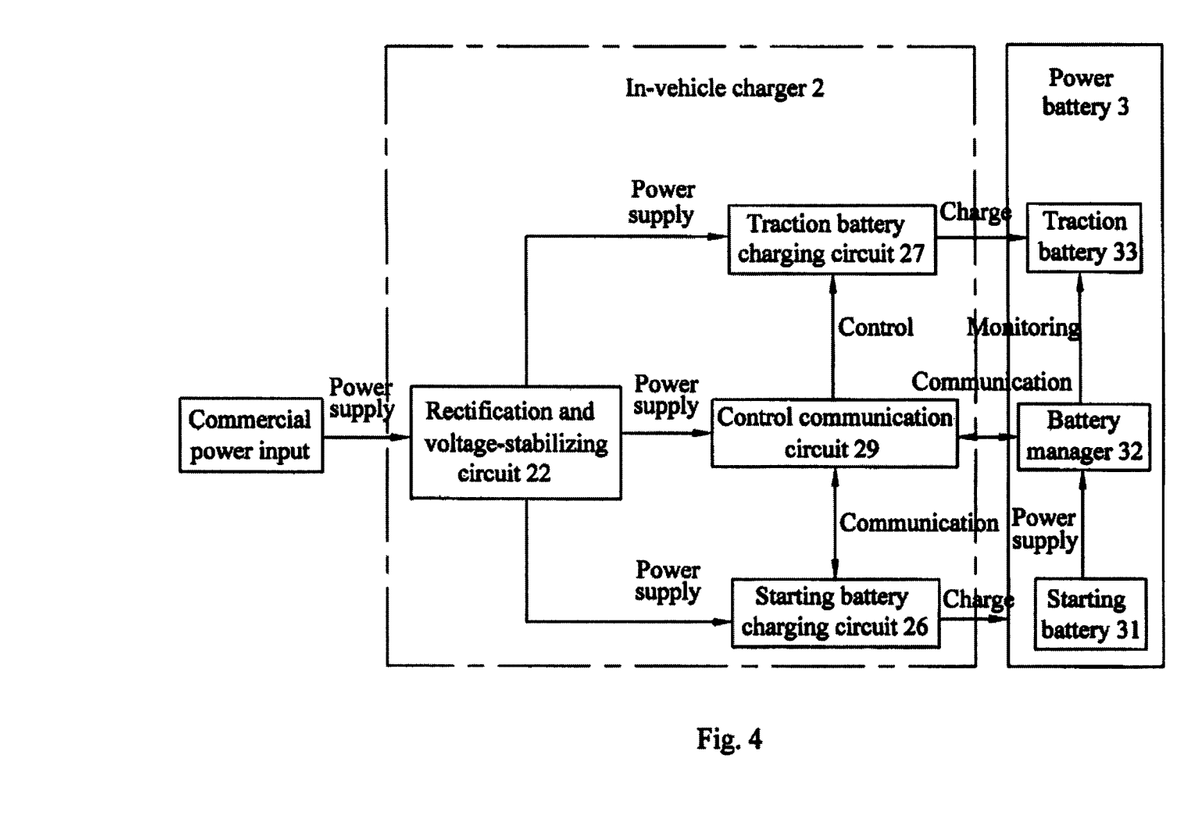
FIG. 4 is a structural view of an in-vehicle charger according to an embodiment of the present invention.

FIG. 4 shows the in-vehicle charger 2 according to an embodiment of the present invention. It is noted that the relay in the linking line is not related to the present invention and detailed descriptions thereof are omitted. The in-vehicle charger 2 according to embodiments of the present invention comprises the rectification and voltage-stabilizing circuit 22, the traction battery charging circuit 27, the control communication circuit 29, as well as a starting battery charging circuit 26. The starting battery charging circuit 26 is electrically connected with the rectification and voltage-stabilizing circuit 22. The starting battery charging circuit 26 may charge the starting battery 31 under the control of the control communication circuit 29. The starting battery charging circuit 26 may comprise a flyback topology circuit, a forward circuit, or a half-bridge topology circuit. Because the voltage of the traction battery 33 of the EV or HEV is significantly greater than the voltage of the starting battery 31, the power of the starting battery charging circuit 26 will be less than the voltage of the traction battery charging circuit 27. The power of the starting battery charging circuit 26 may be selected based on the total power consumed by the vehicle body electric system (the relay in the starting battery charging circuit 26, the battery manager 32, and all combined instruments, etc.) in a continuous operation state during the charging of the starting battery 31. If the total consumption of power is 36V, the output power of the starting battery charging circuit 26 has to be higher than 36V in order to prevent the voltage of the starting battery 31 from decreasing during the charging process.

Figure 5:
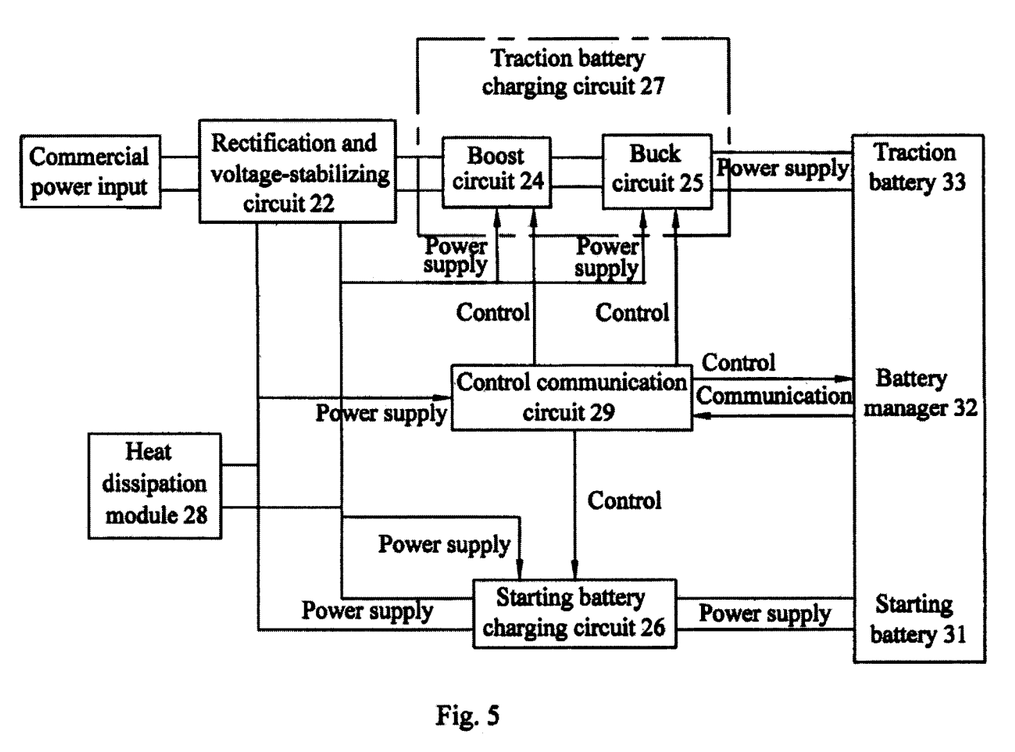
FIG. 5 is a schematic view of circuits in the in-vehicle charger according to the embodiment of the present invention of FIG. 4.

As shown in FIG. 5, the rectification and voltage-stabilizing circuit 22 may rectify and stabilize the commercial power to provide a current signal with stable voltage to the starting battery charging circuit 26. The control site of the starting battery charging circuit 26 is electrically connected with the control communication circuit 29. The starting battery charging circuit 26 may charge the starting battery 31 of the power battery 3 of the EV or HEV under the control of the control communication circuit 29.

Referring to the embodiment of the present invention shown in FIG. 5, when the starting battery 31 and the traction battery 33 of the EV or HEV simultaneously feed power, the in-vehicle charger 2 inputs the commercial power, and the control communication circuit 29 and the rectification and voltage-stabilizing circuit 22 may then supply power to the traction battery charging circuit 27 and the starting battery charging circuit 26. Because the starting battery 31 is feeding power and may not supply power to the battery manager 32, the starting battery charging circuit 26 may charge the starting battery 31 under the control of the control communication circuit 29. The starting battery charging circuit 26 may be supplied power by the rectification and voltage-stabilizing circuit 22, and the power may be isolated and converted into a suitable voltage to charge the starting battery 31. The starting battery charging circuit 26 may be a switching power supply circuit of the flyback topology type. When the charging voltage for the starting battery 31 reaches a threshold, the starting battery charging circuit 26 may feed a signal to the control communication circuit 29, which then communicates the signal to the battery manager 32. Once charging of the traction battery 33 is started via the communication between the control communication circuit 29 and the battery manager 32, the traction battery charging circuit 27 may continually charge the traction battery 33 under the control of the control communication circuit 29 until the charging of the traction battery 33 is complete or when the charging is manually stopped. The electric energy of the starting battery 31 and the traction battery 33 ensures the vehicle may operate after charging for a period of time.

In addition, because the starting battery charging circuit 26 may continually charge the starting battery 31 during the charging process, it is not necessary to use the DC/DC converter to charge the starting battery as long as the power of the starting battery charging circuit 26 reaches a required value. This improves the charging efficiency and also reduces the number of the electrical apparatus required in the charging process.

The in-vehicle charger 2 further comprises a heat dissipation module 28. The heat dissipation module 28 is connected with the rectification and voltage-stabilizing circuit and may be supplied power by the rectification and voltage-stabilizing circuit. The heat dissipation module 28 is suitable for heat dissipation of the in-vehicle charger 2 and may employ air cooling or water cooling depending on conditions.

According to other embodiments of the present invention, when the starting battery 31 and traction battery 33 of the EV or HEV simultaneously feed power, the user may not require other vehicles to assist in supplying electric energy, as long as a commercial power socket is available to enable charging of the starting battery 31 and traction battery 33.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. An in-vehicle charger, comprising:
   a rectification and voltage-stabilizing circuit, which inputs, rectifies, and stabilizes a commercial power;
   a traction battery charging circuit, which is electrically connected with the rectification and voltage-stabilizing circuit, and which charges a traction battery;
   a control communication circuit, which is electrically connected with the rectification and voltage-stabilizing circuit, and which controls the traction battery charging circuit; and
   a starting battery charging circuit, which is directly and electrically connected with the rectification and voltage-stabilizing circuit, and which starts charging of a starting battery under control of the control communication circuit,
   wherein the control communication circuit is configured to control the traction battery charging circuit to start charging the traction battery after a charging voltage for the starting battery reaches a threshold, and wherein the control communication circuit is further configured to control the starting battery charging circuit to charge the starting battery at the same time of the traction battery charging circuit is charging the traction battery.

2. The in-vehicle charger of claim 1, wherein the starting battery charging circuit includes a flyback topology circuit, a forward circuit, or a half-bridge topology circuit.

3. The in-vehicle charger of claim 2, wherein the starting battery charging circuit is a flyback-topology-type switching power supply circuit.

4. The in-vehicle charger of claim 3, wherein the traction battery charging circuit comprises a boost circuit and a buck circuit.

5. The in-vehicle charger of claim 4, wherein the rectification and voltage-stabilizing circuit is a power factor correction circuit.

6. The in-vehicle charger of claim 1, further comprising a heat dissipation module electrically connected with the rectification and voltage-stabilizing circuit.

7. The in-vehicle charger of claim 1, wherein the charging of the traction battery is started until the charging of the traction battery is complete or when the charging is manually stopped.

8. An in-vehicle charger, comprising:
   a rectification circuit;
   a first battery charging circuit electrically connected to the rectification circuit for charging a first battery;
   a control communication circuit electrically connected to the rectification for controlling the first battery charging circuit; and
   a second battery charging circuit directly and electrically connected with the rectification for starting charging of a second battery under control of the control communication circuit, wherein the control communication circuit is configured to control the first battery charging circuit to start charging the first battery after a charging voltage for the second battery reaches a threshold, and wherein the control communication circuit is further configured to control the starting battery charging circuit to charge the starting battery at the same time of the first battery charging circuit is charging the first battery.

9. The in-vehicle charger of claim 8, wherein the second battery charging circuit includes a flyback topology circuit, a forward circuit, or a half-bridge topology circuit.

10. The in-vehicle charger of claim 9, wherein the second battery charging circuit includes a switching power supply circuit.

11. The in-vehicle charger of claim 10, wherein the first battery charging circuit comprises a boost circuit and a buck circuit.

12. The in-vehicle charger of claim 11, wherein the rectification circuit includes a power factor correction circuit.

13. The in-vehicle charger of claim 8, further comprising a heat dissipation module electrically connected with the rectification circuit.

14. The in-vehicle charger of claim 9, wherein the charging of the traction battery is started until the charging of the traction battery is complete or when the charging is manually stopped.

15. An in-vehicle charger, comprising:
   a rectification and voltage-stabilizing circuit, which rectifies a commercial power;
   a traction battery charging circuit, which is electrically connected with the rectification and voltage-stabilizing circuit and configured to charge a traction battery;
   a control communication circuit, which is electrically connected with the rectification and voltage-stabilizing circuit and configured to control the traction battery charging circuit; and
   a starting battery charging circuit, which is electrically connected with and configured to receive charges from the rectification and voltage-stabilizing circuit to charge a starting battery under control of the control communication circuit,
   wherein the control communication circuit is configured to control the traction battery charging circuit to start charging the traction battery after a charging voltage for the starting battery reaches a threshold, and wherein the control communication circuit is further configured to control the starting battery charging circuit to charge the starting battery at the same time of the traction battery charging circuit is charging the traction battery.

16. The in-vehicle charger of claim 15, wherein the starting battery charging circuit comprises a flyback topology circuit, a forward circuit, or a half-bridge topology circuit.

17. The in-vehicle charger of claim 15, wherein the starting battery charging circuit comprises a flyback-topology-type switching power supply circuit.

18. The in-vehicle charger of claim 15, wherein the traction battery charging circuit comprises a boost circuit and a buck circuit.

19. The in-vehicle charger of claim 15, wherein the rectification and voltage-stabilizing circuit comprises a power factor correction circuit.

20. The in-vehicle charger of claim 15, further comprising a heat dissipation module electrically connected with the rectification and voltage-stabilizing circuit.

21. The in-vehicle charger of claim 15, wherein the charging of the traction battery is started until the charging of the traction battery is complete or when the charging is manually stopped.

\* \* \* \* \*